Oct. 31, 1944.  W. H. DE LANCEY  2,361,678
CLUTCH
Filed April 16, 1943  2 Sheets-Sheet 1

INVENTOR
WARREN H. DE LANCEY
BY
Chapin & Neal
ATTORNEYS

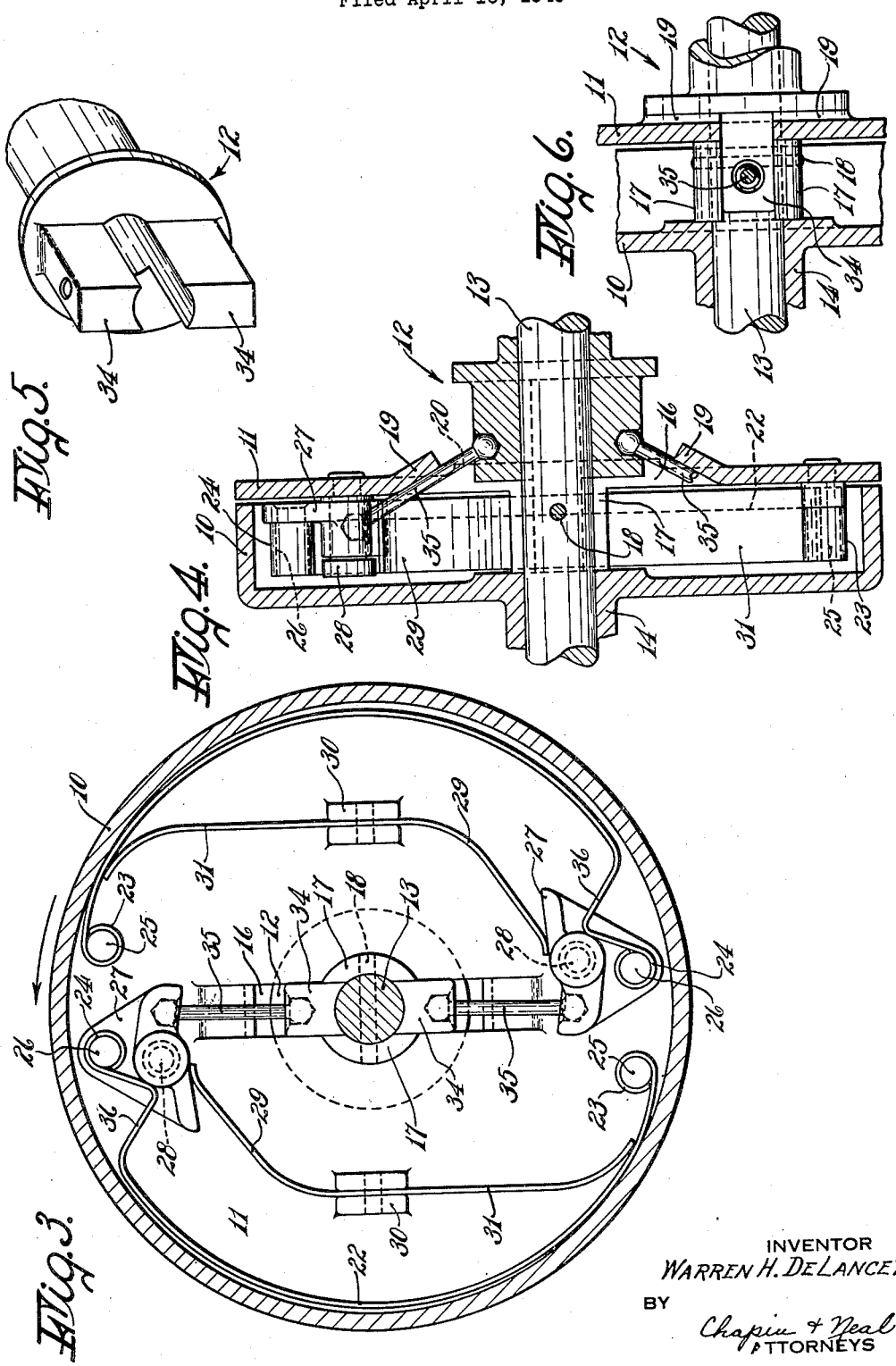

Patented Oct. 31, 1944

2,361,678

UNITED STATES PATENT OFFICE 2,361,678

CLUTCH

Warren H. De Lancey, Springfield, Mass., assignor to Gilbert & Barker Manufacturing Company, West Springfield, Mass., a corporation of Massachusetts Application April 16, 1943, Serial No. 483,291

5 Claims. (Cl. 192—74)

This invention relates to improvements in clutches.

The invention has for one object to provide an improved clutch construction in which the driving and driven elements may be locked in engagement in an infinite number of angular positions.

The invention has for another object the provision of an improved clutch construction in which the driving and driven members may be locked in engaged position by a toggle action.

The invention has for a further object the provision of resilient means, in connection with the clutch bands or shoes, for taking care of such overtravel of the actuating means as is necessary for such means to reach locking position after the bands or shoes have been engaged with the member they are adapted to drive or be driven by, as the case may be.

The invention has for a further object the provision of a clutch shifter which is movable with the exertion of little force from clutch-disengaged to clutch-engaged position and which is nevertheless effectively held in each of its extreme positions.

The invention has for a further object the provision in a clutch having driving and driven members, of one or more spring bands carried by one such member and adapted to be engaged with the other member to effect an operable driving engagement, and spring means acting to yieldingly hold the larger portion of each band away from the second-named member and to yieldingly hold another and smaller portion of such band engaged with the second-named member.

These and other objects of the invention will best be understood as the detailed description proceeds and they will be pointed out in the appended claims.

The invention will be disclosed with reference to the accompanying drawings in which:

Figs. 3 and 4 are views taken similarly to Figs. 2 and 1, respectively, and showing the clutch in released position;

Fig. 5 is a fragmentary perspective view of the shiftable control element of the clutch; and Fig. 6 is a fragmentary sectional plan view taken on the line 6—6 of Fig. 1.

Figure 1:
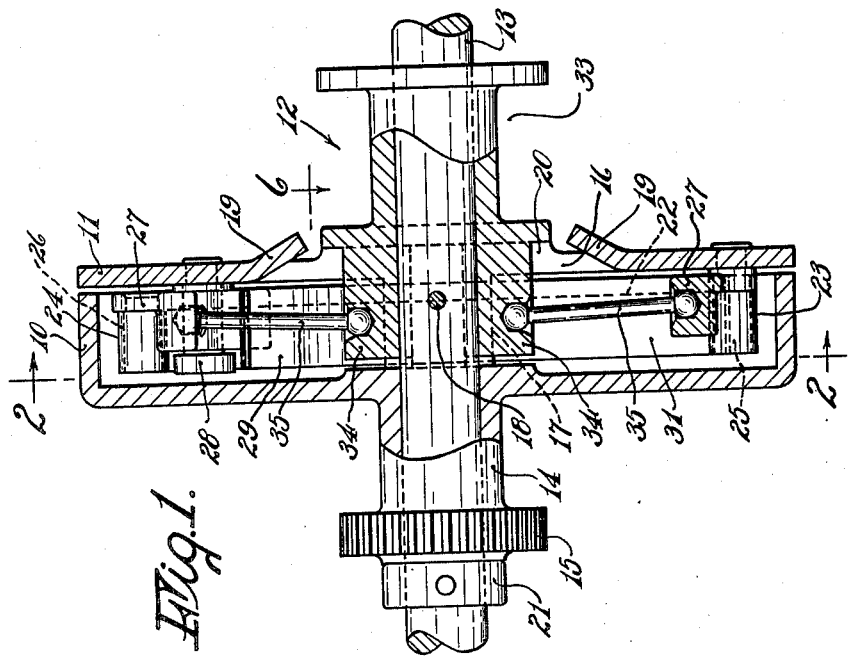
Fig. 1 is a cross sectional view, taken on the line 1—1 of Fig. 2, of a clutch embodying the invention and shown in engaged position.

Referring to these drawings, the clutch includes a drum-shaped driving element 10, a plate-like driven element 11, and a shiftable control element 12, all mounted on a shaft 13 which may be rotatably supported in any suitable manner (not shown). In this particular case, the drum 10 has a hub 14 provided with a gear 15, which is suitably driven from any source of power, and the plate 11 is fixed to shaft 13. The arrangement is reversible, however, and shaft 13 might be driven so that plate 11 becomes the driving and drum 10 the driven element of the clutch.

The plate 11 has a rectangular opening 16 therethrough, the long axis of the opening being located diametrically of the plate. Projecting inwardly from the plate and located one on each side of the opening 16 are two segmental hub portions 17. A pin 18 passes through both portions and through shaft 13, thereby fixing the plate thereto. The planar parts of the confronting surfaces of the segments 17 lie in the planes of the side walls of the opening 16, as shown in Fig. 2. At the ends of opening 16 are outturned inclined walls 19 which converge toward a point in the axis of shaft 13 located outside of the drum and to the right thereof as viewed in Fig. 1. The plate 11 also has exterior hub segments 20, located one on each side of opening 16 and corresponding to the inside segments 17 but of larger diameter.

Figure 2:
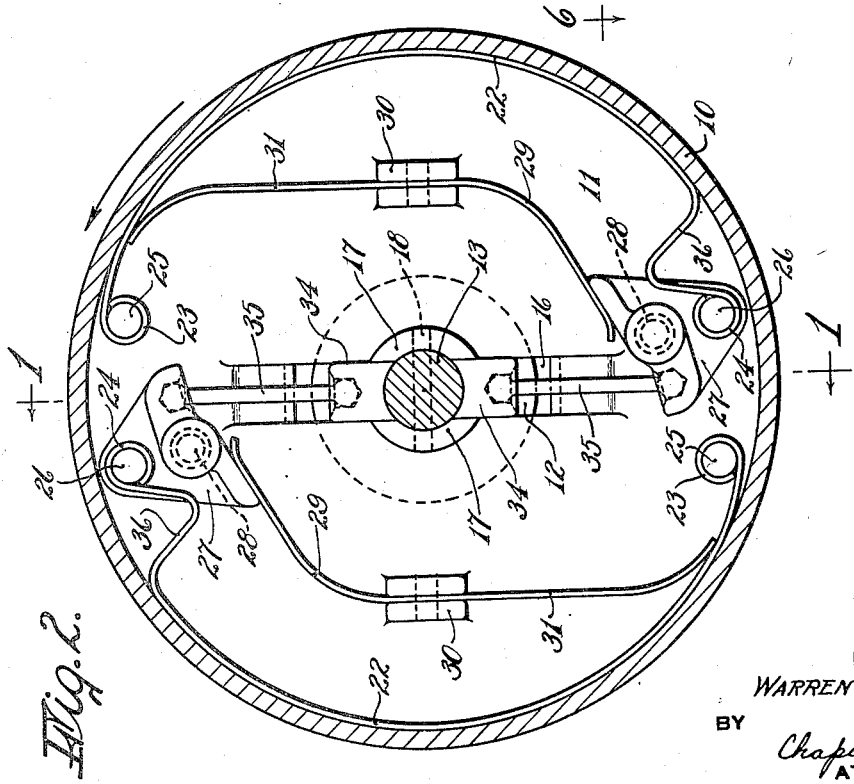
Fig. 2 is a sectional view thereof taken on the line 2—2 of Fig. 1.

The drum 10 is free to turn on shaft 13 and is held in axial position thereon by and between a collar 21 fixed to the shaft and the end faces of the inner hub segments 17 as shown in Fig. 1.

The member 11 carries a plurality of members (two as shown) to engage the inner peripheral wall of drum 10. These may be bands or shoes. In the particular form illustrated in Fig. 2, these members are arcuate spring bands 22 carried by and pivotally mounted on the plate 11. Each band has loops 23 and 24, one at each end thereof, to respectively receive pins 25 and 26. The pin 25 is fixed to plate 11 and forms the fulcrum for the band 22. The pin 26 is carried by a rocker 27, pivotally mounted on a stud 28, fixed to plate 11. A flat spring 29, fixed to and between a pair of lugs 30 on plate 11, bears on the rocker 27, tending to swing it counterclockwise and release the band. An extension 31 of this spring may be arranged as shown to bear on its band 22 near the fulcrum 25 and prevent complete release of the band from the drum where such feature is desirable. As will be clear from Fig. 3 which shows the clutch in released position, each spring 31 holds a small portion of its band 22 against the drum 10.

For the purpose of pressing the bands against drum 10 to engage the clutch, each rocker 27 is connected to the slidable control member 12. This member is spool-shaped, affording an annular groove 33 in which the forked end of any suitable shifting lever may be engaged. Formed on one end face of this member are two approximately rectangular parts 34 disposed one on each side of the axial shaft-receiving hole in the member 12. These parts 34 slidably fit in the opening 16 one on each side of shaft 13 and also between the confronting planar faces of the hub segments 17. The engagement between the side faces of the parts 34 and the side walls of opening 16 causes the clutch collar to turn with the driving plate 11 at all times. Each of these members 34 is connected to the adjacent rocker 27 by means of a dumb-bell shaped link 35. The ball ends of each link fit in sockets formed one in each of the confronting faces of the two parts 34 and 27 which it connects. Pressure of the springs 29 keeps the links engaged in their sockets. The clutch shifter 12, when moved into the position shown in Fig. 4, draws the links 35 into inclined relation and allows the rockers 27 to be moved inwardly by springs 29 to release bands 22. The links then engage one with each of the inclined lips 19 on plate 11, which serve as stops to limit the outward shifting movement of member 12. When the clutch is to be engaged, member 12 is shifted to the left as viewed in Fig. 4, thereby causing links 35 to turn the rockers 27 counterclockwise and press bands 22 against drum 10. The links 35 are then held by toggle action in clutch-engaged position as shown in Fig. 1. The shifter 12 can move until its inner end face engages the end faces of the hub segments 20 as stops. When this engagement occurs, the inner ball ends of the two links 35 will have crossed the line of centers which connect the outer ball ends of these links and lie to the left of such line as viewed in Fig. 1. The thrust of springs 29 on the links tends now to move the inner ball ends to the left, as viewed in Fig. 1, but such movement is prevented by the engagement of member 12 with the hub segments 20. Hence the clutch is locked in engaged position and cannot be released until member 12 is moved to the right far enough to draw the inner ball ends of the links to the right of said line of centers, whereupon springs 29 move them rapidly to the released position shown in Fig. 4.

Each band 22 has an approximately V-shaped bend 36 therein, located adjacent its rocker 27. This bend is compressible to take care of any overtravel of the rocker arms. That is, the sides of each portion 36 can and do move closer together after bands 22 have been pressed as tightly as possible against drum 10. This will be clear from a comparison of Figs. 2 and 3.

The particular embodiment of the invention herein illustrated is intended for use in connection with a counting or registering mechanism. One example of such use will be found in my copending application Serial No. 481,384 filed April 1, 1943. For such use, the driving and driven members must not slip, the one relatively to the other, when moving in the direction (counterclockwise as viewed in Figs. 2 and 3) necessary to advance the indicator of the register. However, these members must be allowed to slip, the one relatively to the other, when the registering means is reset to zero. When resetting such means, the clutch is released. It is desirable however, not to entirely release the bands 22 from drum 10 but to leave portions thereof engaged, as shown in Fig. 3, to prevent relative movement of the driving and driven members except when they are intentionally relatively moved. The clutch, as constructed for use in the aforesaid mechanism, is much smaller than is shown in the drawings, the latter being drawn about two and three quarters times actual size. Nevertheless, the clutch may be made larger and adapted for the transmission of a greater amount of power without departing from the principles of construction and operation herein disclosed.

The operation of the clutch will be clear from the foregoing description. It should be noted, however, that the clutch construction is such that it is not necessary for the operator to exert any force in order to hold the clutch elements in either engaged or disengaged positions. The pressure of the release springs 29, acting on the rockers 27, forces the links 35 against lips 19 and thereby keeps the elements in released position. The toggle lock maintains the elements in engaged position and furthermore locks them in such position. It will be clear also that the driving and driven elements may, by the use of bands or shoes, be locked in any one of an infinite number of angular positions. Another advantage is that the clutch shifter 12 may be easily actuated. A relatively small force applied to the shifter 12 will serve to expand the shoes or bands and cause them to be pressed tightly against the drum. This follows from the well known mechanical advantage of the toggle which is herein interposed between the rockers 27 and the shifter 12 which actuates them. It should also be noted that the bands 22 are so arranged that they tend to wedge into engagement with the drum. Assuming that the drum is turning in a counterclockwise direction and the bands 22 are pressed into engagement with the drum, the latter will pick up the bands and drive them in a counterclockwise direction and this tends to force them even more tightly into engagement with the drum.

The invention thus provides an improved clutch construction with a control element easily shiftable from one extreme position to the other, together with means for holding such element and the driving and driven elements which it controls in both extreme positions and locked by toggle action in any of an infinite number of angular positions.

What I claim is:

1. In a clutch, a drum, a plate, a shaft rotatably supporting the drum and plate, a plurality of arc-shaped bands, each having one end pivotally supported from the plate and its peripheral part adapted to engage the inner periphery of said drum, rocker arms one for each band and pivotally mounted on said plate, the other end of each band being pivotally connected to its rocker arm, flat springs one for each band carried by said plate and each having one end bearing on a rocker arm to turn the latter in a direction such as to draw its band away from the drum, and means axially shiftable on said shaft for moving each rocker arm in an opposite direction such as to press the bands against the drum.

2. In a clutch, a drum, a plate, a shaft rotatably supporting the drum and plate, a plurality of arc-shaped bands, each having one end pivotally supported from the plate and its peripheral part adapted to engage the inner periphery of said drum, rocker arms one for each band and pivotally mounted on said plate, the other end of each band being pivotally connected to its rocker arm, flat springs one for each band, each spring fixed intermediate its ends to said plate and having one end bearing on a rocker arm to hold the major portion of its band away from the drum, the other end of each spring bearing against its band near the pivotal connection of such band to the plate and holding a small portion of its band engaged with the drum, and means axially shiftable on said shaft for moving the rocker arms to press substantially the entire amount of each band into engagement with the drum.

3. In a clutch, driving and driven members one of which consists of a drum and the other of a plate, a plurality of drum-engaging elements carried by the plate, a supporting shaft for said members, and means for forcing said elements against the drum, said means including an axially-shiftable member mounted to turn with the plate, and toggle links one for each element and each connected at its outer end to such element and at its inner end to said shiftable member, the latter being shiftable from one extreme position in which said elements are released and the lower ends of the links are spaced a substantial amount to one side of a plane passing through the outer ends of the links to a second extreme position in which said elements are pressed against the drum and the lower ends of the links have moved slightly beyond the opposite side of said plate, and stop means for preventing movement of the shiftable member beyond the last named extreme position, whereby said elements are held by a toggle lock in engaged position.

4. In a clutch, a drum, a plate, a shaft rotatably supporting the drum and plate, an arc-shaped band pivotally connected at one end to the plate and adapted to be moved toward and away from the inner periphery of the drum, resilient means for moving the band away from the drum, and means for moving the band toward and against the inner periphery of the drum, said means including a shifter axially movable on said shaft and a toggle link connection interposed between the shifter and the other end of said band, said shifter moving from released position to a fixed position in which the band is engaged and the shifter link and band being held in band-engaged position by the toggle action of said link, said band having a substantially V-shaped portion near its connection to said link, whereby after the shifter has moved the band into engagement with the drum any further movement of the shifter in the same direction will move the sides of said V-shaped portion closer together to take up any overtravel in the shiftable member necessary to reach its extreme and band-engaged position.

5. In a clutch, a drum, a plate adjacent the open end of the drum, a shaft rotatably supporting the drum and plate, a plurality of arc-shaped bands each pivoted at one end to said plate to swing about an axis parallel to that of said shaft and movable toward and away from the inner periphery of the drum, rocker arms one for each band each pivotally mounted on said plate to swing about an axis parallel to that of said shaft, the other end of each band being pivotally connected to its rocker arm, spring means acting on each rocker arm to move the bands away from the drum to released position, said plate having radial slots one for each band, a shifter axially slidable on said shaft, extensions of said shifter slidably engaged one in each slot, links having their outer ends connected one to each rocker arm and their inner ends one to each said extension, and stop means on said plate engageable with said links to limit the movement of the latter and said shifter by the band-releasing spring means.

WARREN H. DE LANCEY.